United States Patent
Kim

(10) Patent No.: US 10,118,720 B2
(45) Date of Patent: Nov. 6, 2018

(54) SUPPLY APPARATUS FOR DRUG PACKAGING

(71) Applicant: CRETEM CO., LTD., Anyang-si, Gyeonggi-do (KR)

(72) Inventor: Ho Yeon Kim, Anyang-si (KR)

(73) Assignee: CRETEM CO., LTD., Anyang-si (KR)

( * ) Notice: Subject to any disclaimer, the term of this patent is extended or adjusted under 35 U.S.C. 154(b) by 0 days.

(21) Appl. No.: 15/535,492

(22) PCT Filed: Dec. 14, 2015

(86) PCT No.: PCT/KR2015/013669
§ 371 (c)(1),
(2) Date: Jun. 13, 2017

(87) PCT Pub. No.: WO2016/099098
PCT Pub. Date: Jun. 23, 2016

(65) Prior Publication Data
US 2018/0016044 A1   Jan. 18, 2018

(30) Foreign Application Priority Data

Dec. 15, 2014 (KR) .................. 10-2014-0180759

(51) Int. Cl.
| B65H 3/60 | (2006.01) |
| B65B 37/04 | (2006.01) |
| B65B 57/14 | (2006.01) |

(52) U.S. Cl.
CPC .............. B65B 37/04 (2013.01); B65B 57/14 (2013.01)

(58) Field of Classification Search
CPC ............ B65B 1/30; B65B 37/04; B65G 47/14
USPC .................................. 53/131.5; 221/200, 123
See application file for complete search history.

(56) References Cited

U.S. PATENT DOCUMENTS

| 2,989,165 | A | * | 6/1961 | Cozart | .................... G07F 11/16 194/246 |
| 3,254,794 | A | * | 6/1966 | Meresz | .................... G07F 11/16 221/124 |
| 5,971,205 | A | * | 10/1999 | Michaels | ................ G07F 9/105 221/135 |

(Continued)

FOREIGN PATENT DOCUMENTS

| JP | 05-037742 U | 5/1993 |
| JP | 05-037743 U | 5/1993 |

(Continued)

OTHER PUBLICATIONS

International Search Report for PCT/KR2015/013669 dated Mar. 29, 2016 from Korean Intellectual Property Office.

*Primary Examiner* — Rakesh Kumar
(74) *Attorney, Agent, or Firm* — Paratus Law Group, PLLC

(57) ABSTRACT

Disclosed is a supply apparatus for drug packaging, used to supply a plurality of units of a drug to drug packaging members. The supply apparatus includes: a supply unit providing a supply path along which the units of a drug are supplied; a support unit elastically supporting the supply unit in such a manner such that the supply unit is inclined; a vibration unit vibrating the supply unit; and a detection unit detecting the units of a drug passing through the supply unit. According to this structure, it is possible to reduce drug supply errors, thereby improving drug supply efficiency.

7 Claims, 3 Drawing Sheets

(56) References Cited

U.S. PATENT DOCUMENTS

| | | | | |
|---|---|---|---|---|
| 5,996,838 A * | 12/1999 | Bayer | ................ | G07F 11/42 |
| | | | | 221/130 |
| 2005/0023286 A1 * | 2/2005 | Pinney | ................ | G06F 19/3462 |
| | | | | 221/123 |
| 2012/0006843 A1 | 1/2012 | Kim | | |
| 2017/0372553 A1 * | 12/2017 | Gray | ................ | G07F 7/025 |
| 2018/0016044 A1 * | 1/2018 | Kim | ................ | B65B 37/04 |

FOREIGN PATENT DOCUMENTS

| | | | | | |
|---|---|---|---|---|---|
| JP | 06336322 A | * | 12/1994 | ............ | B65B 37/12 |
| KR | 10-1014874 B1 | | 2/2011 | | |
| KR | 101014874 B1 | * | 2/2011 | | |
| KR | 10-2012-0082547 A | | 7/2012 | | |
| KR | 20120082547 A | * | 7/2012 | ............ | B65B 37/04 |
| KR | 10-1231776 B1 | | 2/2013 | | |
| KR | 101231776 B1 | * | 2/2013 | | |

* cited by examiner

SUPPLY APPARATUS FOR DRUG PACKAGING

CROSS REFERENCE TO PRIOR APPLICATIONS

This application is a National Stage Patent Application of PCT International Patent Application No. PCT/KR2015/013669 (filed on Dec 14, 2015) under 35 U.S.C. § 371, which claims priority to Korean Patent Application No. 10-2014-0180759 (filed on Dec 15, 2014), which are all hereby incorporated by reference in their entirety.

TECHNICAL FIELD

The invention relates to a supply apparatus for drug packaging. More particularly, the invention relates to a supply apparatus for drug packaging, the apparatus being capable of increasing a drug supply rate when supplying discrete forms of a drug to drug packaging members.

BACKGROUND ART

Drug packaging apparatuses that automatically dispense a plurality of units of a drug (the units hereinafter meaning tablets, capsules, pills, lozenges, and any other discrete forms of a drug that can be individually handled, and the units of a drug hereinafter being referred to as simply drug units) as prescribed for a variety of illnesses and package the drug units in single doses have recently become widely available. The drug packaging apparatuses are required to dispense and package a drug unit by unit.

Such a drug packaging apparatus is equipped with a supply apparatus that guides drug units discharged from a drug storage tank to drug packaging members. However, when drug units that are sequentially discharged, unit by unit, from a drug storage tank are supplied to drug packaging members through the supply apparatus, the drug units time-divisionally discharged from the drug storage tank are likely to be supplied to the same drug packing member. Alternatively, the drug units are likely to congest a supply path of the supply apparatus, resulting in the drug units staying in the supply apparatus. That is, drug dispensing errors occur when drug units are conveyed to drug packaging members through the supply apparatus.

DISCLOSURE

Technical Problem

Accordingly, the present invention has been made in view of the problems occurring in the related art and an object of the present invention is to provide a supply apparatus for drug packaging, the apparatus being capable of preventing drug supply errors by supplying drug units at predetermined time intervals.

Technical Solution

In order to accomplish the object of the present invention, according to one aspect, there is provided a supply apparatus for drug packaging, the apparatus including: a supply unit configured to supply drug units and provide a supply path along which the drug units are supplied; a support unit elastically supporting the supply unit; a vibration unit vibrating the supply unit; and a detection unit detecting the drug units.

According to the aspect, the supply unit may have an inclined pipe shape having a U-shaped cross section and may be inclined such that a drug discharge side thereof is lower than a drug introduction side.

According to the aspect, the support unit may support the supply unit such that the supply unit is inclined to slope down from an inlet to an outlet thereof in a drug supply direction.

According to the aspect, the support unit may include a spring hinge elastically supporting the inlet of the supply unit.

According to the aspect, the vibration unit may include a vibrator installed on the supply unit.

According to the aspect, the detection unit may include a first sensor installed near the inlet of the supply unit in an drug supply direction and detecting the drug unit introduced into the supply unit, a second sensor installed near the outlet of the supply unit in the drug supply direction and detecting the drug unit discharged out of the supply unit, and at least one third sensor installed between the first sensor and the second sensor and detecting the drug unit passing through the supply unit.

According to the aspect, the supply apparatus may further include a shutter that is installed near the outlet of the supply unit in the drug supply direction and prevents the drug units from being discharged out of the supply unit in accordance with detection information detected by the detection unit.

Advantageous Effects

According to the present invention having the structure described above, first, it is possible to discharge drug units out of the supply unit by means of vibration, thereby improving drug supply efficiency.

Second, since the supply unit is elastically supported, drug units can be continuously introduced into the supply unit regardless of the weight of the drug units.

Third, since the drug units passing through the supply unit can be detected, it is possible to detect a supply error such as drug congestion in a supply path of the supply unit, thereby allowing a user to take measures to solve the problem.

BEST MODE

Mode for Invention

Hereinafter, preferred embodiments of the present invention will be described with reference to the accompanying drawings.

Figure 1:
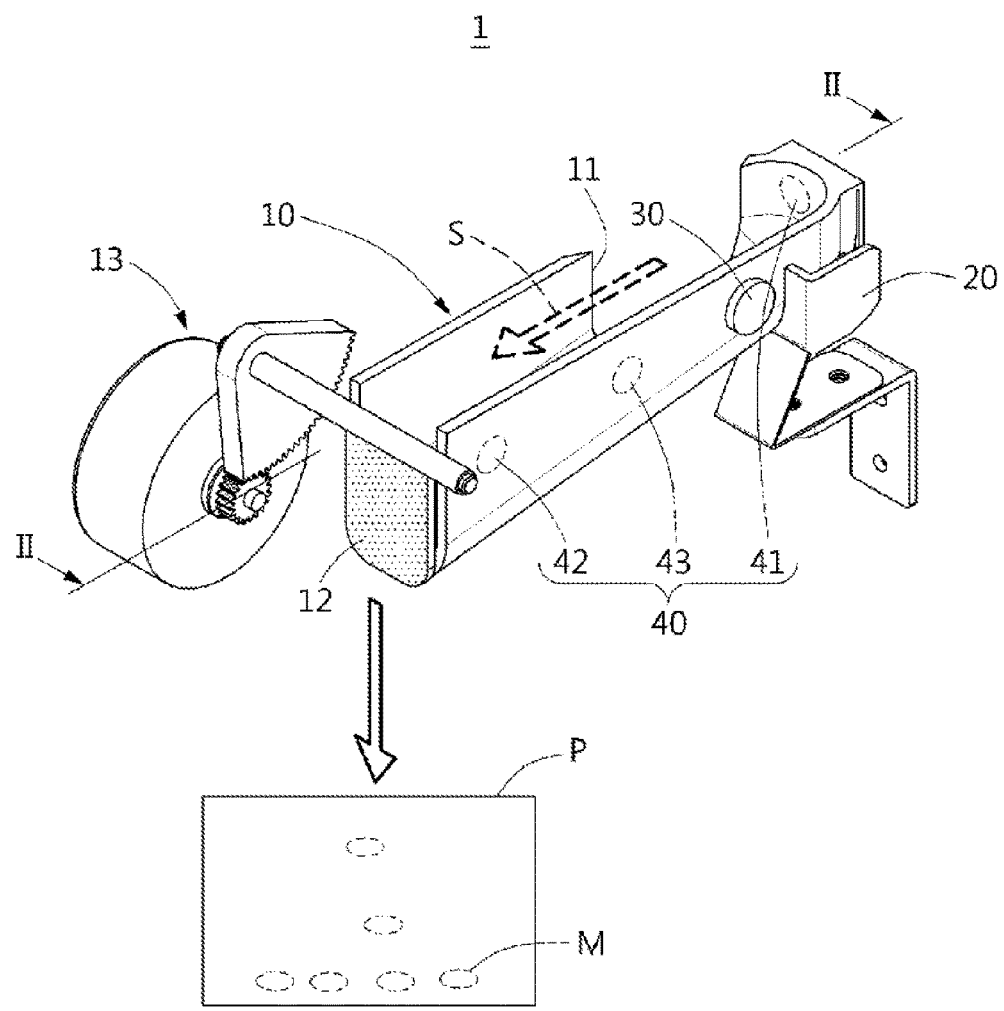
FIG. 1 is a perspective view schematically illustrating a supply apparatus for drug packaging according to one embodiment of the present invention.

As illustrated in FIG. 1, according to the preferred embodiment of the present invention, a supply apparatus 1 for drug packaging is an apparatus for supplying drug units M to drug packaging members P. The supply apparatus includes a supply unit 10, a support unit 20, a vibration unit 30, and a detection unit 40.

The supply unit 10 provides a supply path along which the drug units M are conveyed and supplied to the drug packaging members. Although the supply unit 10 is not illustrated in detail, the supply unit 10 is connected to a storage unit (not shown) in which the drug units M are stored at an inlet side thereof and to the drug packaging member P at an outlet side thereof. Thus, the drug units M discharged from the storage unit (not shown) are supplied to the drug packaging members P.

At this point, the inlet of the supply unit 10 is provided with an introduction hole 11 through which the drug units M are introduced into the supply unit 10, and the outlet of the supply unit is provided with a shutter 12 that can open and close a discharge hole in the outlet. The shutter 12 blocks the discharge hole so that the drug units M cannot be supplied to the drug packaging members P as necessary. That is, when there is trouble such as a supply error of the drug units M or a preparation error of the drug packaging member P, the discharge hole of the supply unit 10 is closed by the shutter 12. For reference, the shutter 12 is driven by a shutter driver 13.

Figure 2:
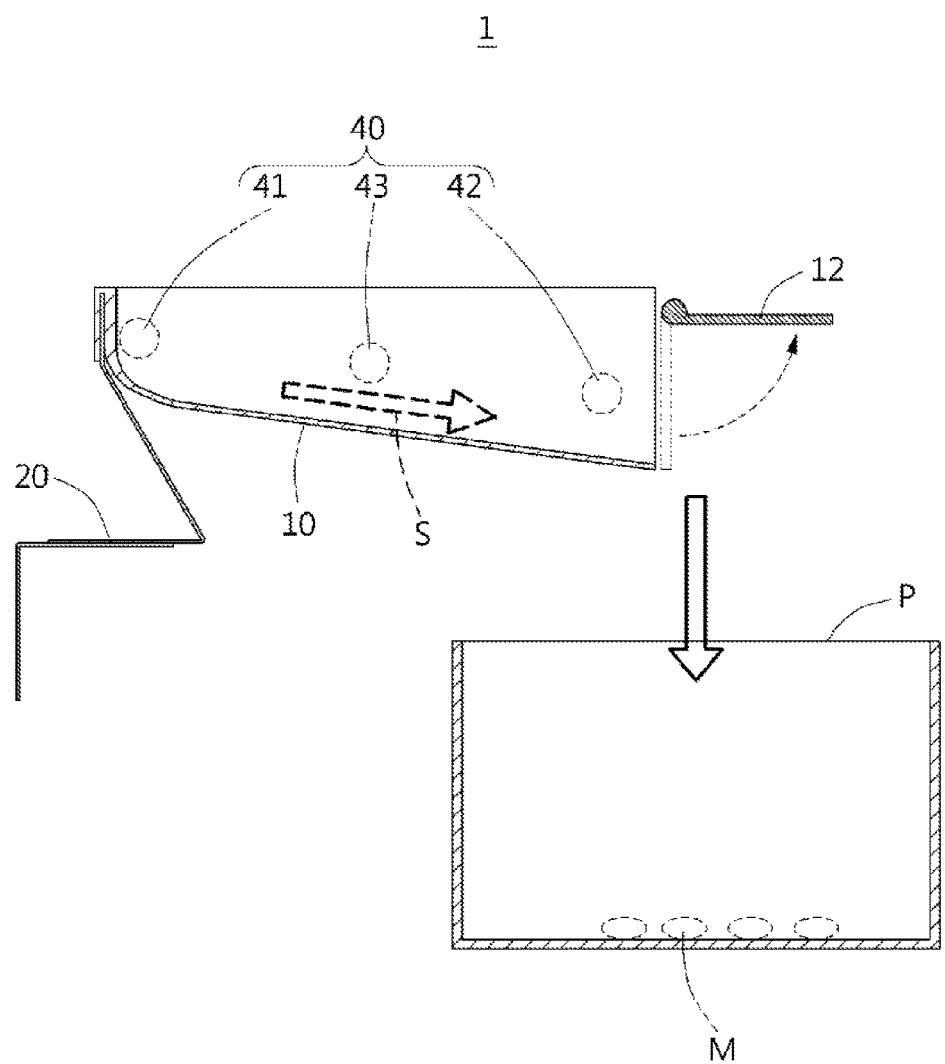
FIG. 2 is a cross-sectional view taken along a line II-II of FIG. 1.

As shown in FIG. 2, the supply unit 10 has a pipe shape with an open upper end and a U-shaped cross section. Due to the U-shaped cross section of the supply unit 10, there is little friction between the drug units M and the inside surface of the supply unit. Therefore, the drug units M can easily pass through the supply unit 10, and the drug units M are rarely damaged by friction while passing through the supply unit 10.

For reference, although the supply unit 10 has a straight pipe shape such that the drug units M are guided in one direction in the present embodiment, but the supply unit 10 is not limited to the present embodiment. That is, the supply unit 10 may be an L-shaped pipe such that the drug supply direction is not linear but changes. The shape of the supply unit 10 may diversely vary according to conditions in which the drug units M are supplied to drug packaging members.

The support unit 20 elastically supports the supply unit 10 such that the supply unit 10 is inclined. The support unit 20 supports the supply unit 10 such that the supply unit 10 is inclined to slope down from the inlet to the outlet thereof, i.e. in a drug supply direction.

Meanwhile, as shown in FIG. 2, the support unit 20 includes a spring hinge that elastically supports the inlet of the supply unit 10. That is, the support unit 20 elastically supports the inlet of the support unit 20. Due to the support unit 20 including the spring hinge, even though a heavy drug unit M is introduced through the inlet of the supply unit 10, the inlet of the supply unit 20 can be maintained not to be lowered because of being elastically supported.

The vibration unit 30 vibrates the supply unit 10. The vibration unit 30 includes a vibrator installed near the inlet of the supply unit 10 and generates vibration of the supply unit 10. Since the vibration unit 30 vibrates the supply unit 10, the drug units M are not likely to stay near the inlet in the supply unit 10 but to easily move toward the outlet of the supply unit 10.

Both of the vibration unit 30 and the support unit 20 are disposed near the inlet of the supply unit 10. The spring hinge of the support unit 20 elastically supports the inlet of the supply unit 10. Therefore, the deformation of the supply unit 20 increases from the inlet to the outlet due to the vibration caused by the vibration unit 30. In addition, as described above, the support unit 20 supports the supply unit 10 inclined such that the outlet is lower than the inlet, i.e. sloped down in a direction in which drug units are supplied.

Therefore, even in a case where drug units M introduced into the inlet of the supply unit 10 are stacked or jammed, since the amplitude of the vibration increases toward the outlet of the supply unit, the drug units become separated from each other as they approach the outlet of the supply unit and thus the drug units are sequentially conveyed. Therefore, the drug units can be sequentially discharged unit by unit out of the supply unit.

Figure 3:
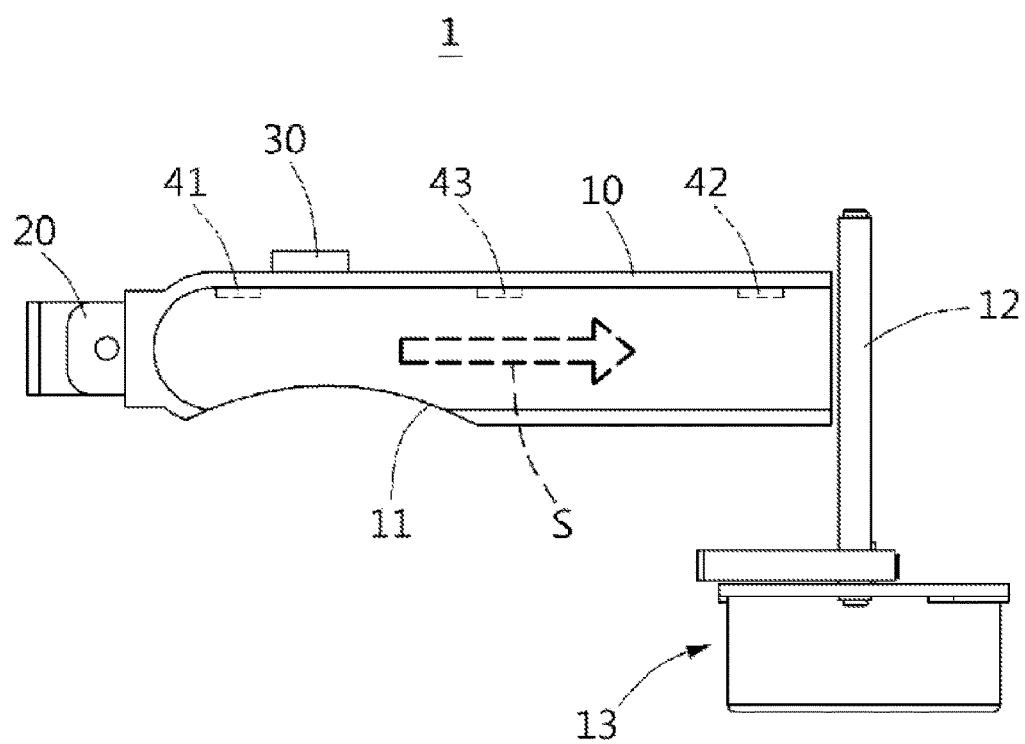
FIG. 3 is a plan view schematically illustrating the supply apparatus for drug packaging of FIG. 1.

The detection unit 40 detects the drug units M passing through the supply unit 10. As illustrated in FIGS. 2 and 3, the detection unit 40 includes a first sensor 41, a second sensor 42, and a third sensor 43, and detects the drug units M in the supply unit 10.

The first sensor 41 is installed near the inlet of the supply unit 10 in a drug supply direction S in which the drug units M are supplied to the drug packaging member, and detects the drug unit introduced into the supply unit 10. The second sensor 42 is installed near the outlet of the supply unit 10 in the drug supply direction S and detects the drug unit discharged out of the supply unit 10. The at least one third sensor 43 is installed between the first sensor 41 and the second sensor 42 to detect the drug unit M passing through the supply unit 10.

The shutter 12 installed at the outlet of the supply unit 10 is operated in accordance with detection information detected by the first to third sensors 41, 42, and 43. Specifically, when at least one sensor of the first to third sensors 41, 42, and 43 detects a supply error of the drug units M passing through supply unit 10, the shutter 12 closes the discharge hole of the supply unit 10.

According to the present embodiment, each of the first to third sensors 41, 42, and 43 installed in the supply unit 10 consists of one sensor, but the present invention is not limited thereto. That is, each of the first to third sensors 41, 42, and 43 may include a pair of sensors arranged to face each other or a plurality of sensors arranged in a circumferential direction of the supply unit 10. Configuration of each sensor of the first to third sensors may be diversely altered. Meanwhile, a modification in which the third sensor 43 includes a plurality of sensors arranged side by side in the drug supply direction S is also possible.

A drug supply method performed by the supply apparatus 1 for drug packaging, according to the present invention, will be described below with reference to FIGS. 1 to 3.

As illustrated in FIG. 1, when a drug unit M is introduced into the inlet of the supply unit 10, which is elastically supported by the support unit 20, the first sensor 41 of the detection unit 40 detects the drug unit M. The drug unit M introduced into the supply unit 10 moves in the drug supply direction S by means of an inclined structure of the supply unit that is inclined at a predetermined inclination angle and vibration caused by the vibration unit 30, passes the third sensor 43 in a middle portion of the supply unit 20, and continuously moves toward the outlet of the supply unit 10. The drug unit M that reaches the outlet of the supply unit 10 is discharged out of the supply unit 10 when the shutter 12 is open. At this point, a drug supply error can be detected by the second sensor 42 installed near the outlet of the supply unit 10.

Although a preferred embodiment of the present invention has been described for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention relates to a drug packaging apparatus that can be used in hospitals, pharmacies, senior care centers, etc.

The invention claimed is:

1. A supply apparatus for drug packaging, the apparatus supplying a drug unit to a drug packaging member, the apparatus comprising:
   a storage container in which drug units are stored;
   a supply channel having a hinged distal end, a free distal end opposite to the hinged distal end, an inlet through which the drug units are introduced into the supply channel from the storage container and positioned next to the hinged distal end, and an outlet from which the drug units are discharged outside and posited at the free distal end, the supply channel providing a supply path connecting the inlet and the outlet to each other, the outlet being arranged to be lower than the inlet;
   a supporter including a spring hinge having a distal end fixed to the hinged distal end of the supply channel and an opposite distal end fixed to a fixture other than the supply channel, the supporter elastically supporting the hinged distal end of the supply channel;
   a vibrator vibrating the supply channel at the hinged distal end such that an amplitude of vibration caused by the vibrator increases toward the outlet from the inlet; and
   a plurality of detection sensors detecting the drug units passing through the supply channel.

2. The supply apparatus for drug packaging, according to claim 1, wherein the supply channel has an open top and a U-shaped cross section.

3. The supply apparatus for drug packaging, according to claim 1, wherein the supporter elastically supports the hinged distal end of the supply channel such that the supply channel is inclined to slope down from the inlet to the outlet in a supply direction.

4. The supply apparatus for drug packaging, according to claim 1, wherein a slope between the inlet and the outlet is set such that the drug units do not move from the inlet to the outlet of the supply channel when vibration is not generated but move when vibration is generated.

5. The supply apparatus for drug packaging, according to claim 1, wherein the vibrator is installed in a position near the inlet of the supply channel.

6. The supply apparatus for drug packaging, according to claim 1, wherein the plurality of detection sensors comprises:
   a first sensor installed near the inlet of the supply channel in a supply direction and detecting the drug unit drug units introduced into the inlet of the supply channel;
   a second sensor installed near the outlet of the supply channel in the supply direction and detecting the drug units discharged out of the supply channel; and
   at least one third sensor arranged between the first sensor and the second sensor and detecting the drug units passing through the supply channel.

7. The supply apparatus for drug packaging, according to claim 1, further comprising a shutter that is installed near the outlet of the supply channel and allows or prohibits discharge of the drug units out of the supply channel in accordance with detection information detected by the plurality of detection sensors.

* * * * *